US009769787B2

(12) United States Patent
Vos (10) Patent No.: US 9,769,787 B2
(45) Date of Patent: Sep. 19, 2017

(54) METHOD AND SYSTEM FOR FACILITATING TRANSMISSION OF TTI BUNDLES VIA A LTE DOWNLINK CHANNEL

(71) Applicant: Sierra Wireless, Inc., Richmond (CA)

(72) Inventor: Gustav Gerald Vos, Surrey (CA)

(73) Assignee: Sierra Wireless, Inc., Richmond (CA)

( * ) Notice: Subject to any disclaimer, the term of this patent is extended or adjusted under 35 U.S.C. 154(b) by 103 days.

(21) Appl. No.: 13/956,008

(22) Filed: Jul. 31, 2013

(65) Prior Publication Data
US 2015/0036476 A1    Feb. 5, 2015

(51) Int. Cl.
| H04W 68/00 | (2009.01) |
| H04W 28/04 | (2009.01) |
| H04W 72/12 | (2009.01) |
| H04L 1/18 | (2006.01) |
| H04W 28/06 | (2009.01) |
| H04W 72/14 | (2009.01) |

(52) U.S. Cl.
CPC ......... *H04W 68/005* (2013.01); *H04L 1/1877* (2013.01); *H04L 1/1887* (2013.01); *H04W 28/04* (2013.01); *H04W 72/1278* (2013.01); *H04W 28/06* (2013.01); *H04W 72/14* (2013.01)

(58) Field of Classification Search
None
See application file for complete search history.

(56) References Cited

U.S. PATENT DOCUMENTS

| 7,729,346 | B2 | 6/2010 | Lee et al. | |
| 9,144,066 | B2 | 9/2015 | Vos et al. | |
| 2008/0002688 | A1 | 1/2008 | Kim et al. | |
| 2011/0141878 | A1 | 6/2011 | Che et al. | |
| 2011/0141952 | A1* | 6/2011 | Wang et al. | ................... 370/294 |
| 2011/0237283 | A1 | 9/2011 | Shan et al. | |
| 2012/0020512 | A1 | 1/2012 | Tracy | |
| 2013/0223307 | A1 | 8/2013 | Ohlsson et al. | |
| 2013/0223485 | A1 | 8/2013 | Bai et al. | |

(Continued)

FOREIGN PATENT DOCUMENTS

| EP | 1638278 A2 | 3/2006 |
| EP | 2280505 A1 | 2/2011 |

(Continued)

OTHER PUBLICATIONS

Ericsson, "HARQ operation in case of UL Power Limitation", Jun. 2007, pp. 1-4.

(Continued)

*Primary Examiner* — Michael Thier
*Assistant Examiner* — Kent Krueger
(74) *Attorney, Agent, or Firm* — Hahn Loeser & Parks, LLP- San Diego (57) ABSTRACT

A method and system for facilitating communication between an Evolved Node B (eNB) and a user equipment (UE) in a Long Term Evolution (LTE) network. In particular the technology addresses downlink transmission via potentially large TTI bundles. The eNB transmits a downlink grant message to the UE, indicating a pending TTI bundle for downlink transmission. The UE transmits an acknowledgement message to the eNB if the DL grant message is successfully received and decoded. The eNB aborts transmission of the TTI bundle if it fails to timely receive the acknowledgement and may reassign the network resources scheduled for use in the transmission. In some embodiments, the eNB may introduce a delay between the downlink grant message and the TTI bundle.

24 Claims, 4 Drawing Sheets

(56) References Cited

U.S. PATENT DOCUMENTS

2014/0335876 A1* 11/2014 Ratasuk et al. ............... 455/450
2014/0362832 A1* 12/2014 Rudolf et al. ................ 370/336

FOREIGN PATENT DOCUMENTS

| WO | WO 2008/024158 A1 | 2/2008 |
| --- | --- | --- |
| WO | 2008/085003 A1 | 7/2008 |
| WO | WO 2010/052537 A1 | 5/2010 |
| WO | WO 2010/111428 A2 | 9/2010 |
| WO | WO 2011/123809 A1 | 6/2011 |
| WO | 2014/100898 A1 | 7/2014 |

OTHER PUBLICATIONS

Palat and Godin, "Network Architecture", in: Sesia et al., *LTE—The UMTS Long Term Evolution: From Theory to Practice.*, John Wiley Ltd, 2011, pp. 25-55.

Roke Manor Research, "LTE MAC Scheduler & Radio Resource Scheduling", 2011, pp. 1-8.

Van_Der_Velde, Hinke, "Control Plane Protocols"*LTE—The UMTS Long Term Evolution: From Theory to Practice.*, John Wiley Ltd, 2011, pp. 61-62.

Vodafone, "Updated SID on: Provision of low-cost MTC UEs based on LTE" Sep. 2013, pp. 1-6.

U.S. Appl. No. 13/730,244, filed Dec. 28, 2012.

Office Action issued in U.S. Appl. No. 13/730,244 on Nov. 25, 2014.

International Search Report and Written Opinion issued in International Application No. PCT/CA2013/050609 on Oct. 18, 2013.

International Search Report and Written Opinion issued in International Application No. PCT/CA2014/050677 on Jul. 31, 2013.

Notice of Allowance dated May 12, 2015 for U.S. Appl. No. 13/730,244, now U.S. Pat. No. 9,144,066.

Extend European Search Report for European application No. 13868715.5-1851/2939464 PCT/CA2013/050609, Sep. 23, 2016.

* cited by examiner

METHOD AND SYSTEM FOR FACILITATING TRANSMISSION OF TTI BUNDLES VIA A LTE DOWNLINK CHANNEL

FIELD OF THE INVENTION

The present technology pertains in general to wireless communication systems operating according to standards such as the Long Term Evolution (LTE), and in particular to mechanisms for providing improved efficiency when transmit time interval (TTI) bundling is utilized.

BACKGROUND

Improved coverage in wireless communication systems such as Third Generation Partnership Project (3GPP™) LTE is sought after for various reasons. Coverage improvements may call for an increase in practical gain of various physical channels such as the Physical Downlink Control Channel (PDCCH). The LTE protocol currently being developed and implemented provides a high-speed wireless communication network for use by devices such as mobile phones and data terminals. The LTE protocol itself is detailed in various documents, for example as published by the 3$^{rd}$ Generation Partnership Project (3GPP).

Hybrid Automatic Repeat Request (HARQ) processes proposed for LTE transmit blocks of data along with error detection and forward error correction (FEC) bits. In incremental redundancy HARQ, if the errors in a received data block cannot be corrected, the transmitter is informed via Negative Acknowledgement (NACK) and the data block is retransmitted. The retransmission is coded differently from the previous transmissions and retransmissions of the same data block; that is in accordance with a different redundancy version (RV). The receiver may then combine different redundancy versions to improve the probability of successfully decoding the data block. This type of HARQ effectively lowers the coding rate with each retransmission. HARQ effectively improves coverage, however due to signalling and processing delays, only one redundancy version can be transmitted every 8 ms.

TTI bundling has been proposed as a modification to the HARQ mechanism, in order to provide improved coverage without dramatically increasing latency and signalling overhead. A detailed overview of TTI bundling can be found in "HARQ Operation in case of UL Power Limitation," Ericsson, June 2007, 3GPP TDoc R2-072630. Essentially, rather than waiting for a NACK before transmitting the next redundancy version of a data block, several redundancy versions are transmitted in consecutive transmit time intervals (TTIs). The HARQ feedback is sent after the last redundancy version of the data block is received. Current implementations specify transmission of four redundancy versions at a time. To preserve backward compatibility, further retransmission (if triggered due to a NACK) is delayed until the 16$^{th}$ TTI after the first redundancy version was sent.

Increasing the TTI bundle size beyond 4 RVs is a possible way to improve coverage. For example, a 3rd Generation Partnership Project (3GPP) work item entitled "Updated SID on: Provision of low-cost MTC UEs based on LTE" (TSG RAN meeting #57, Chicago, USA, September, 2012, RP-121441), relates to a new study requiring a +20 dB improvement in coverage for LTE systems. To obtain such a +20 dB improvement through TTI bundling would require a TTI bundle size of 400 RVs.

However, it has been recognized by the inventors that the current TTI bundling methods potentially result in inefficiencies if certain messages are lost or corrupted. In particular, if the User Equipment (UE) fails to decode a downlink grant message which notifies the UE that that a large TTI bundle is forthcoming for it, then that UE will not attempt to decode the TTI bundle. However, currently there is no mechanism to notify the eNB that the UE is not receiving the TTI bundle and hence the Evolved Node B (eNB) will transmit the TTI bundle in its entirety, thereby unnecessarily consuming spectral resources.

Therefore there is a need for a method and system for implementing TTI bundling that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE INVENTION

An object of the present technology is to provide a method and system for facilitating transmission of TTI bundles via a LTE downlink channel. In accordance with an aspect of the present technology, there is provided a method for facilitating communication between an Evolved Node B (eNB) and a user equipment (UE) in a Long Term Evolution (LTE) system, the method comprising: transmitting a downlink (DL) grant message from the eNB to the UE, the DL grant message indicative of a pending TTI bundle for transmission from the eNB to the UE; transmitting an acknowledgement message from the UE to the eNB when the DL grant message is successfully received and decoded by the UE; and aborting transmission of the TTI bundle from the eNB to the UE when successful receipt by the eNB of the acknowledgement message fails to occur within an expected time interval.

In accordance with another aspect of the present technology, there is provided a system comprising an Evolved Node B (eNB) and a user equipment (UE) in a Long Term Evolution (LTE) system, the system comprising: a downlink (DL) grant acknowledgement module of the UE, the DL grant acknowledgement module configured to transmit an acknowledgement message from the UE to the eNB in response to a downlink (DL) grant message being successfully received and decoded, the DL grant message transmitted from the eNB to the UE and indicative of a pending TTI bundle for transmission from the eNB to the UE; a transmission abort module of the eNB, the transmission abort module configured to abort transmission of the TTI bundle from the eNB to the UE when successful receipt by the eNB of the acknowledgement message fails to occur within an expected time interval.

In accordance with another aspect of the present technology, there is provided a computer program product comprising a computer readable medium storing computer executable statements and instructions thereon that, when executed by a computer, perform operations for facilitating communication between an Evolved Node B (eNB) and a user equipment (UE) in a Long Term Evolution (LTE) system, the operations comprising: transmitting a downlink (DL) grant message from the eNB to the UE, the DL grant message indicative of a pending TTI bundle for transmission from the eNB to the UE; transmitting an acknowledgement message from the UE to the eNB when the DL grant message is successfully received and decoded by the UE; aborting transmission of the TTI bundle from the eNB to the UE when successful receipt by the eNB of the acknowledgement message fails to occur within an expected time interval.

BRIEF DESCRIPTION OF THE FIGURES

These and other features of the technology will become more apparent in the following detailed description in which reference is made to the appended drawings.

DETAILED DESCRIPTION OF THE INVENTION

Definitions

Unless defined otherwise, all technical and scientific terms used herein have the same meaning as commonly understood by one of ordinary skill in the art to which this technology belongs.

The present technology provides for an LTE system comprising the capability for UEs to explicitly acknowledge downlink (DL) grant messages. In some embodiments, the eNB may request that the UE transmits an explicit acknowledgement. For example, the request may be embedded within or otherwise accompany the DL grant message. In some embodiments, the request is optional, so that the UE will not send an acknowledgement if not requested to do so.

In various embodiments, following receipt of the DL grant message, the UE responds to the request by transmitting an acknowledgement to the eNB. The acknowledgement is indicative that the UE has received the DL grant message and will undertake to receive and decode a particular TTI bundle which is transmitted as specified by the DL grant message. The acknowledgement may be transmitted substantially immediately following the request, as this reduces latency and potentially reduces an amount of resources being wasted.

Continuing with the above, if the eNB receives the acknowledgement, then the entire TTI bundle is transmitted as planned. However, if the eNB fails to receive the acknowledgement within a predetermined time interval, transmission of the TTI bundle is aborted. This may involve interruption of a TTI bundle already in the process of transmission, or cancellation of a TTI bundle scheduled for future transmission, i.e. refraining from commencing transmission of the TTI bundle.

In some embodiments, transmission of an acknowledgement is mandatory, and does not need to be explicitly requested by the eNB. However, such embodiments may result in a loss of backward compatibility within the LTE standard.

As will be readily understood by a worker skilled in the art, DL grant messages, for example in an LTE system, are transmitted by the eNB to target UEs via the physical downlink control channel (PDCCH). DL grant messages are generated and transmitted as part of Media Access Control (MAC) scheduling operations, in which the eNB schedules use of shared channel resources and informs each UE of scheduling information relevant to that UE. The PDCCH is used to inform a UE of shared channel scheduling allocations for both the uplink (e.g. via the physical uplink shared channel PUSCH) and downlink (e.g. via the physical downlink shared channel PDSCH). The DL grant message may specify, for example, a set of upcoming LTE resource elements and/or resource blocks which are scheduled for use in transmission of a TTI bundle intended for receipt by a specific target UE. The target UE will then actively listen to and decode the specified resource blocks.

In various embodiments, the TTI bundle may correspond to an initial transmission of data or a retransmission of data, for example in accordance with operation of a HARQ mechanism or due to an interrupted transmission resulting from operation of the transmission abort mechanism as described herein.

Embodiments of the present technology may be utilized in various wireless communication systems in which notification messages are transmitted over a control channel, informing a terminal that a subsequent message is scheduled to be transmitted over a shared channel for receipt by that terminal, the notification message including details regarding the timing, frequency band, and potentially other relevant details related to the subsequent message.

In accordance with an aspect of the present technology, there is provided a method for facilitating communication between an Evolved Node B (eNB) and a user equipment (UE) in a Long Term Evolution (LTE) system. The method comprises transmitting a downlink (DL) grant message from the eNB to the UE, the DL grant message indicative of a pending TTI bundle for transmission from the eNB to the UE. The method further comprises transmitting an acknowledgement message from the UE to the eNB when the DL grant message is successfully received and decoded by the UE. The method further comprises aborting transmission of the TTI bundle from the eNB to the UE when successful receipt of the acknowledgement by the eNB fails to occur within an expected time interval.

It is noted that in the above method operations of transmitting the acknowledgement message and aborting transmission of the TTI bundle are unlikely to both occur during a single transaction. This is because if the acknowledgement message is transmitted then it will more likely than not be successfully received by the eNB. The method may thus be viewed as describing relevant operations of the UE and the eNB which occur under certain given conditions, and which, in combination, are descriptive of the present technology.

It is therefore to be understood that the method may comprise refraining from transmitting the acknowledgement message from the UE to the eNB when the DL grant message fails to be successfully received and decoded by the UE, and subsequently aborting transmission of the TTI bundle when successful receipt of the acknowledgement by the eNB fails to occur. It is further to be understood that the method may comprise transmitting the acknowledgement message from the UE to the eNB when the DL grant message is successfully received and decoded by the UE, and subsequently refraining from aborting transmission of the TTI bundle when successful receipt of the acknowledgement by the eNB occurs.

In accordance with an aspect of the present technology, there is provided a system comprising an eNB and a UE in an LTE system. The system comprises a downlink (DL) grant acknowledgement module of the UE, the DL grant acknowledgement module configured to transmit an acknowledgement message from the UE to the eNB in response to a downlink (DL) grant message being successfully received and decoded, the DL grant message transmitted from the eNB to the UE and indicative of a pending TTI bundle for transmission from the eNB to the UE. The system further comprises a transmission abort module of the eNB, the transmission abort module configured to abort transmission of the TTI bundle from the eNB to the UE when successful receipt of the acknowledgement by the eNB fails to occur within an expected time interval.

The system may comprise substantially standard eNB and UE hardware, for example as found in LTE systems, with the system further configured through hardware, firmware and/or software in order to implement the grant acknowledgement mechanism and transmission abort mechanism as described herein.

Figure 1:
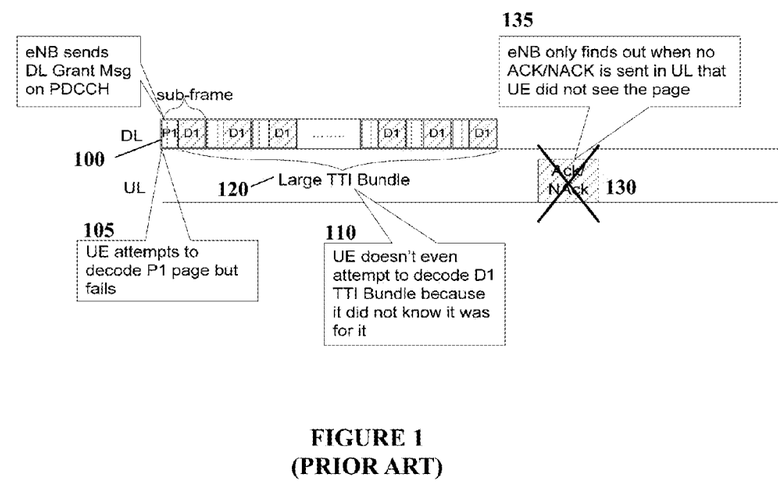
FIG. 1 illustrates transmission of a DownLink (DL) grant message which fails to be decoded, followed by transmission of a TTI bundle, in accordance with the prior art.

FIG. 1 illustrates transmission of a DL grant message which fails to be decoded, followed by transmission of a TTI bundle, in accordance with the prior art. A DL Grant message P1 100 is transmitted from the eNB to the UE via the PDCCH. The UE attempts to decode P1 but fails 105. Thus, the UE does not know 110 that the DL Grant message P1 was indicative of a large TTI bundle D1 120 subsequently transmitted on the PDSCH and intended for receipt by the UE, and hence the UE does not attempt to decode the TTI bundle 120. However, transmission of the TTI bundle 120 proceeds regardless. The eNB still determines 135 that the UE has not received the TTI bundle 120 due to lack of a HARQ Acknowledgement/Negative Acknowledgement 130. However, this does not occur until after the entire TTI bundle 120 has been transmitted. Thus, the resources used to transmit the TTI bundle 120 are wasted, and might have been used more effectively for another purpose. Embodiments of the present technology may be used to address this situation.

Figure 2:
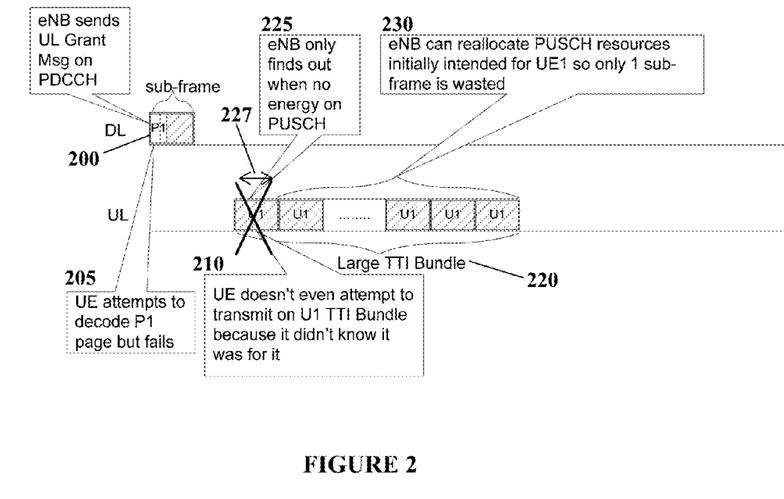
FIG. 2 illustrates transmission of an UpLink (UL) grant message which fails to be decoded, followed by partial transmission of a TTI bundle, based on one possible scenario in accordance with embodiments of the present technology.

FIG. 2 illustrates transmission of an UL grant message which fails to be decoded, followed by partial transmission of a TTI bundle. A UL Grant message P1 200 is transmitted from the eNB to the UE via the PDCCH. The UE attempts to decode P1 but fails 205. Thus, the UE does not even attempt 210 to transmit a pending TTI bundle U1 220 since no grant to do so was received. The eNB can determine that the UE has not received the UL Grant message P1 200 due to detecting 225 a lack of energy on the PUSCH resources indicated in the UL Grant message P1. Such detection may occur after the first subframe 227 during which the TTI bundle U1 220 was scheduled to be transmitted. The eNB can then reallocate 230 the PUSCH resources which were to be used for conveying the TTI bundle U1 220 for some other purpose. Thus only a portion, (e.g. one subframe), of the unused resources are wasted. FIG. 2 illustrates a difference between the UL and the DL situation. In particular, for the UL, the eNB can infer an UL grant failure from the lack of energy on the assigned PUSCH channel, possibly as early as the first sub-frame of the first scheduled TTI. This lack of energy from the UE can be used as an indicator that the UL grant on the PDCCH has failed, and the eNB can then reallocate the PUSCH resources. Thus an UL grant acknowledgement may not be required.

Figure 3:
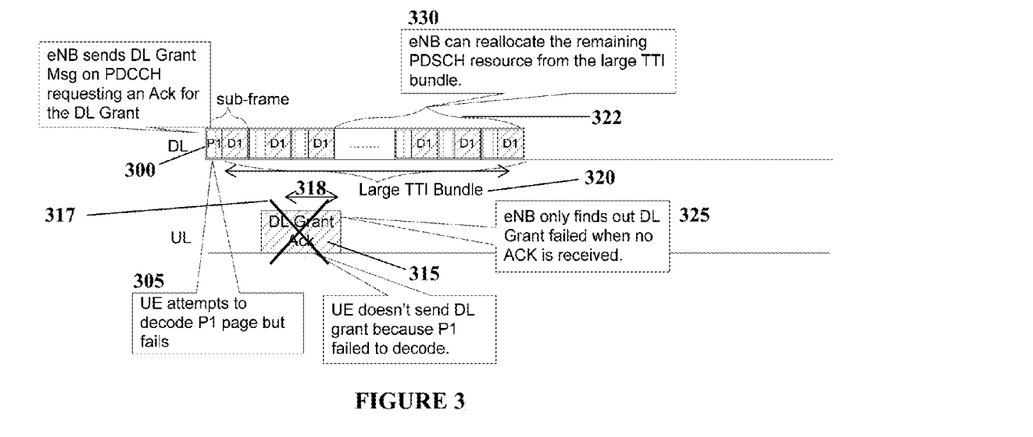
FIG. 3 illustrates transmission of a DL grant message which fails to be decoded, followed by aborted transmission of a TTI bundle, in accordance with some embodiments of the present technology.

FIG. 3 illustrates transmission of a DL grant message which fails to be decoded, followed by aborted transmission of a TTI bundle, in accordance with some embodiments of the present technology. A DL Grant message P1 300 is transmitted from the eNB to the UE via the PDCCH. The UE attempts to decode P1 but fails 305. Thus, the UE does not know that the DL Grant message P1 was indicative of a large TTI bundle D1 320 subsequently transmitted on the PDSCH and intended for receipt by the UE, and hence the UE does not attempt to decode the TTI bundle 320. However, the UE is configured to acknowledge DL Grant messages with a DL Grant Acknowledgement. In the present case, since the DL Grant message 300 was not successfully decoded, the DL Grant Acknowledgement 315 is not sent 317. If the DL Grant message 300 were to have been successfully decoded, the DL Grant Acknowledgement 315 would have been sent during the given time interval 318, and transmission of the TTI bundle 320 would not be aborted as long as the DL Grant Acknowledgement 315 is successfully received and decoded by the eNB. This time interval 318 may be predetermined or scheduled, or the like, as discussed elsewhere herein. The eNB monitors the channel on which the DL Grant Acknowledgement 315 is expected to be sent, and, upon expiry of the time interval 318 the eNB infers 325 that receipt of the DL Grant message 300 has failed. Notably, this occurs before all of the TTI bundle 320 has been transmitted. The eNB can then reallocate 330 at least some of the resources scheduled for use in transmitting an as-yet untransmitted portion 322 of the TTI bundle 320. Thus, these remaining resources may not be wasted. However, some of the TTI bundle 320 will have already been transmitted.

As is apparent from FIG. 3, if transmission of the TTI bundle follows closely after transmission of the DL Grant message, then some of the resources used to transmit the first part of the TTI bundle may be wasted. This is due to a time delay which is necessary to process the DL Grant message, and to communicate and process the corresponding DL Grant Acknowledgement or lack thereof. Even if the DL Grant Acknowledgement is not generated, the eNB is required to wait until it can reasonably conclude that the DL Grant Acknowledgement is not forthcoming, which can only happen at or after the time of expected delivery of the DL Grant Acknowledgement.

In some embodiments, the time delay corresponds to a loss of about 6 sub-frames worth of PDSCH resources. This may be the case for example when it takes at least three slots or sub-frames for the UE to process the DL Grant message and send the DL Grant Acknowledgement, and another three sub-frames for the eNB to receive and process the DL Grant Acknowledgement and reassign the remaining resources reserved for the current TTI bundle. In various embodiments, the time delay may be configured based on expected or measured processing delays, propagation delays, variance in such delays, or the like, or a combination thereof. In some embodiments, time delays may be adjusted based on anticipated and/or observed wireless communication system conditions, latency requirements, or the like.

In some embodiments, transmission of the DL Grant message occurs at least a predetermined time interval before transmission of the related TTI bundle. The DL Grant message may specify a relative time at which transmission of the related TTI bundle is to commence. Thus, a delay is introduced between communication of the DL Grant message and communication of the pending TTI bundle indicated by the DL Grant message. This may provide for a solution to the loss of resources problem described above. In particular, by providing a delay between the DL Grant message and the TTI bundle, the system is provided with time to receive and decode the DL Grant message, transmit the DL Grant Acknowledgement, receive the DL Grant Acknowledgement, and confirm that the UE is ready to receive the TTI bundle, before transmission of the TTI bundle begins. If it cannot be confirmed that the UE is ready to receive the TTI bundle (for example due to failure by the UE to decode the DL Grant message), then the eNB can re-assign the resources (e.g. PDSCH resources) scheduled for use in transmitting the TTI bundle before transmission begins. In this way, resource loss may be mitigated.

It is noted that, in some embodiments, some of the resources which are re-assigned in the above scheme are to be re-assigned on "short notice," if at all. For example, by the time the eNB determines that some LTE resource blocks which were scheduled for use in transmitting the TTI bundle need to be re-assigned to a different UE, there may be insufficient time to assign these resources ahead of time. Therefore, re-assigned resources may be assigned without incorporating further time delays. For example, such resources may be assigned to other UEs not using coverage extension means as described herein.

Figure 4:
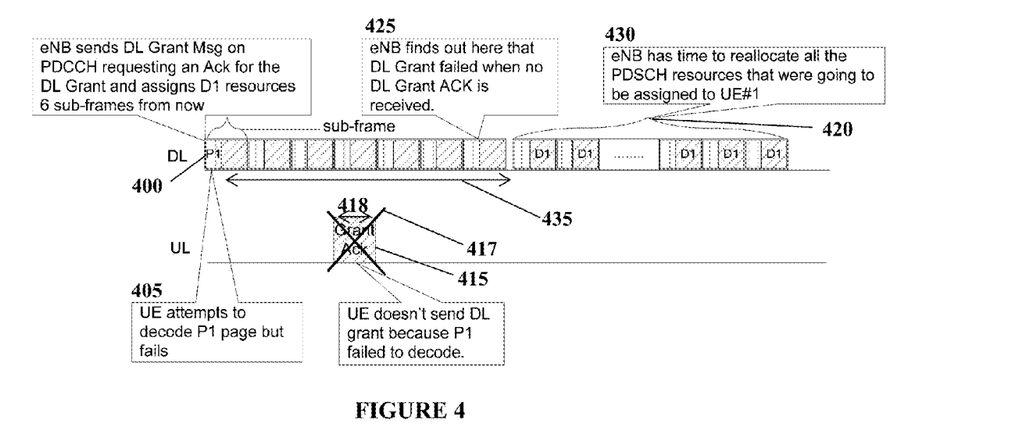
FIG. 4 illustrates transmission of a DL grant message which fails to be decoded, followed by aborted transmission of a TTI bundle, in accordance with other embodiments of the present technology.

FIG. 4 illustrates transmission of a DL grant message which fails to be decoded, followed by aborted transmission of a TTI bundle, in accordance with other embodiments of the present technology. Similarly to FIG. 3, a DL Grant message 400 is transmitted from the eNB to the UE via the PDCCH. The UE attempts to decode the message 400 but fails 405. Thus, the UE does not know that the DL Grant message 400 was indicative of a large TTI bundle D1 420 subsequently to be transmitted on the PDSCH and intended for receipt by the UE, and hence the UE will not attempt to decode the TTI bundle 420. Again, the UE is configured to acknowledge DL Grant messages with a DL Grant Acknowledgement. In the present case, since the DL Grant message 400 was not successfully decoded, the DL Grant Acknowledgement 415 is not sent 417. If the DL Grant message 400 were to have been successfully decoded, the DL Grant Acknowledgement 415 would have been sent during the given time interval 418. The eNB monitors the channel on which the DL Grant Acknowledgement 415 is expected to be sent, and, upon expiry of the time interval 418 the eNB infers 425 that receipt of the DL Grant message 400 has failed. In contrast to FIG. 3, the inference 425 of failure occurs before any of the TTI bundle 420 has been transmitted. This is due to a time delay 435 between transmission of the DL Grant message 400 and transmission of the TTI bundle 420. The time delay 435 is such that the time interval 418 during which reception of the DL Grant acknowledgement 415 is expected occurs before the beginning of transmission of the TTI bundle 420. The eNB can then reallocate 430 up to all of the resources scheduled for use in transmitting the as-yet untransmitted TTI bundle 420.

Figure 5:
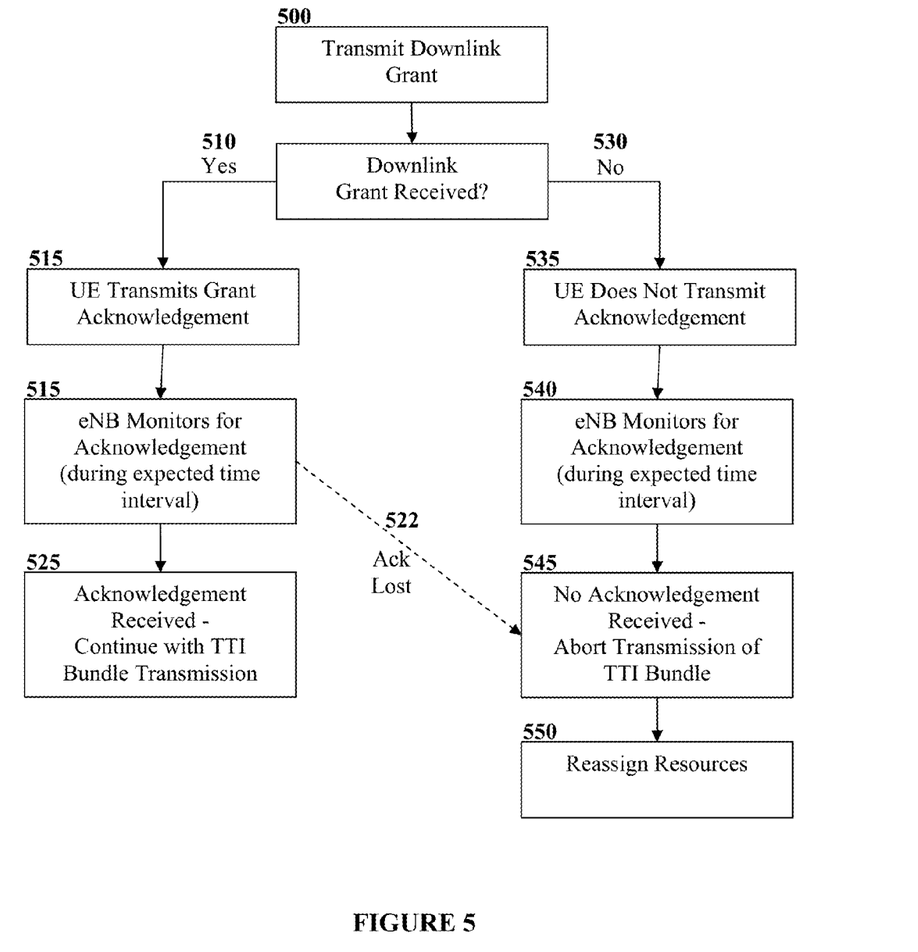
FIG. 5 illustrates a method provided in accordance with embodiments of the technology.

FIG. 5 illustrates a method for facilitating communication between an Evolved Node B (eNB) and a user equipment (UE) in a Long Term Evolution (LTE) system, in accordance with embodiments of the present invention. The method comprises transmitting 500 a downlink (DL) grant message from the eNB to the UE. The DL Grant message is indicative of a pending TTI bundle for transmission from the eNB to the UE. If the DL grant message is successfully received and decoded 510 by the UE, then the UE transmits 515 an acknowledgement message as soon as possible or within a predetermined time interval. The eNB monitors 520 for the acknowledgement message, particularly during a corresponding predetermined time interval. The time interval during which the UE transmits the acknowledgement message corresponds with the time interval during which the eNB monitors for the acknowledgement message, although the two time intervals may be offset due to applicable propagation delays. If the acknowledgement message is successfully received and decoded 525 by the eNB, then transmission of the pending TTI bundle proceeds or continues as scheduled.

Continuing with respect to FIG. 5, if the DL grant message is not successfully received and decoded 530 by the UE, then the UE will naturally not transmit 515 an acknowledgement message, as it will not have registered any relevant stimulus. The eNB again monitors 540 for the acknowledgement message, particularly during the predetermined time interval as described above. Since no acknowledgement message was sent, neither is one successfully received and decoded by the eNB. The eNB therefore determines 545, following the end of the predetermined time interval, that no acknowledgement is forthcoming and aborts transmission of the TTI bundle which is still pending or in the process of being transmitted. The eNB may subsequently reassign 550 the remaining resources which were scheduled to be used in transmission of the TTI bundle.

A possible error condition 522 is also illustrated in FIG. 5, in which the acknowledgement is transmitted by the UE but fails to be properly received and decoded by the eNB. In this case, the eNB may erroneously abort transmission of the TTI bundle, which may result in a requirement for rescheduling transmission of part or all of the TTI bundle. Various measures may be taken to address such an error condition. For example, other layers of the data communication protocol may detect the loss of an expected communication and address retransmissions as necessary. It can be deemed unlikely that the reverse error condition will occur, i.e. in which the eNB appears to receive an acknowledgement from the UE that was not actually transmitted.

In various embodiments, a TTI bundle transmission that is aborted by the eNB due to lack of acknowledgement may be rescheduled. A new DL Grant message may be generated and transmitted to the target UE and the TTI bundle may be retransmitted in its entirety, again subject to transmission abort if a DL Grant acknowledgement is not timely received from the UE. In some embodiments, if transmission of the TTI bundle is aborted a predetermined number of times in a row, for example two or three times, then an error condition may be registered which indicates that the target UE is not responsive in the sense that DL Grant acknowledgement messages do not appear to be generated. In some embodiments, this error condition may result in the eNB ceasing to attempt scheduling further transmissions to the UE. In some embodiments, this error condition may be indicative that the UE is a legacy UE which is not configured to generate DL Grant acknowledgement messages. In this case, the TTI bundle may be transmitted as scheduled without aborting the transmission due to lack of a DL Grant acknowledgement.

In some embodiments, rescheduling transmission of a TTI bundle may be suppressed, for example if the TTI bundle contained time-sensitive data which is no longer relevant or useful.

In some embodiments, if a portion of the TTI bundle has been transmitted prior to the transmission being aborted due to lack of a DL Grant acknowledgement, but the eNB later learns that the UE successfully received and decoded the transmitted portion, then the eNB may be configured to refrain from retransmitting the successfully received portion. This may occur, for example, if the DL Grant acknowledgement was lost or corrupted but another message from the UE was received which indicates that the portion was actually received.

Apparatus

Various embodiments of the present invention relate to an apparatus or system of apparatuses. An apparatus may take the form of a communication device in a wireless communication system supporting TTI bundling, such as an LTE wireless communication system. In some embodiments, the communication device is a wireless subscriber terminal, such as a user equipment (UE), handheld cell phone, PDA, M2M device, or the like. In some embodiments, the communication device is a base station, such as a eNB.

As will be readily understood by a worker skilled in the art, a communication device may comprise various structural elements, such as a power source, microprocessor, memory, signal processing section, radiofrequency (RF) electronics section, antenna, and the like. In various embodiments, an existing communication device, such as a UE, M2M device, eNB, or the like, which is configured to operate in a wireless communication system such as an LTE system, may be further configured to perform various operations such as transmitting acknowledgements in response to DL grant messages, and aborting transmission of TTI bundles in the absence of receipt of such acknowledgements, in accordance with the present invention. Such configuration may be via new software routines loaded into memory of the device and used to guide operation thereof, or similarly via new firmware routines loaded into memory for use by appropriate components such as a microcontroller or digital signal processor. Additionally or alternatively, configuration may be performed by incorporating appropriate specialized hardware, such as electronic components, microcontrollers, logic arrays, signal processing electronics, or the like, into the device. A worker skilled in the art would understand how to adjust operation of an existing communication device or to create a new communication device having the desired operating characteristics as described herein.

Figure 6:
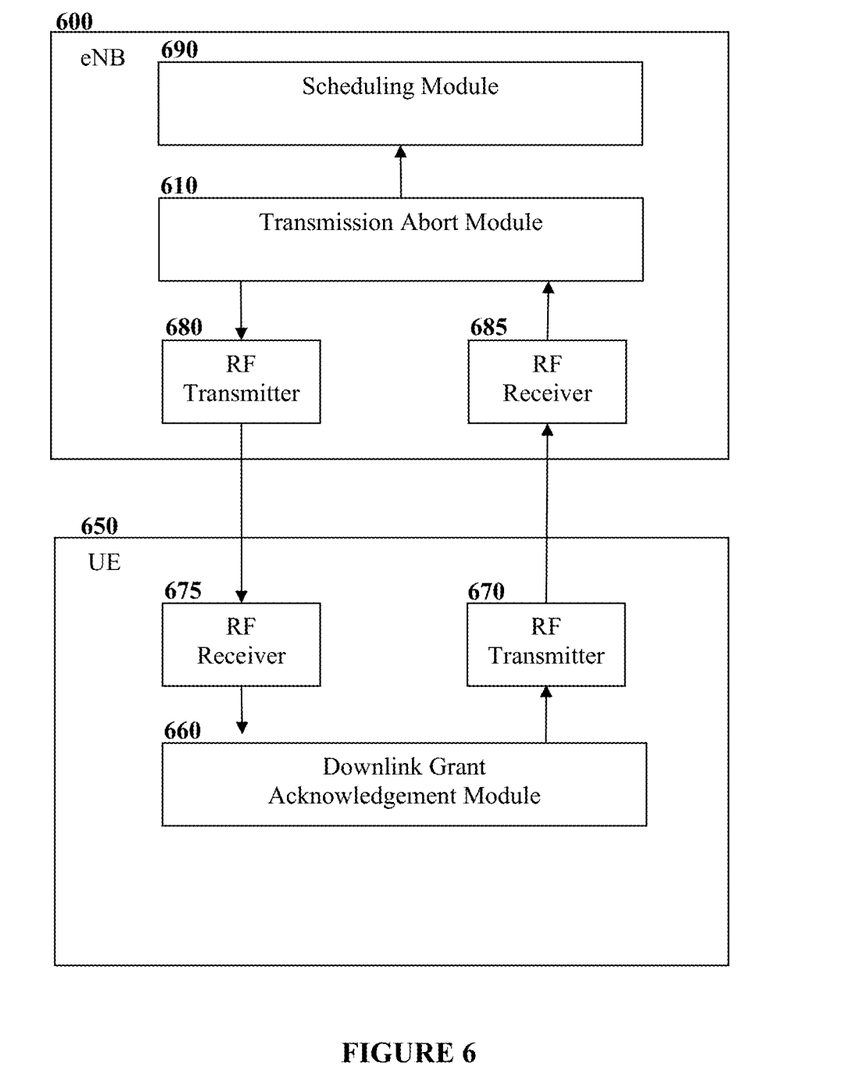
FIG. 6 illustrates a system provided in accordance with embodiments of the technology.

FIG. 6 illustrates a system comprising an Evolved Node B (eNB) 600 and a user equipment (UE) 650 in a Long Term Evolution (LTE) wireless communication system. The UE 650 comprises a downlink (DL) grant acknowledgement module 660, which is configured to transmit an acknowledgement message from the UE to the eNB in response to a downlink (DL) grant message being successfully received and decoded. The DL grant message transmitted is from the eNB to the UE and indicative of a pending TTI bundle for transmission from the eNB to the UE. The UE 650 further comprises various other features such as a wireless communication module, comprising a RF transmitter 670 and RF receiver 675, the wireless communication module configured to facilitate communication with the eNB via an appropriate protocol, such as LTE. Downlink grants and TTI bundles may be communicated to the wireless communication module, and Downlink grant acknowledgements may be communicated from the wireless communication module, for example. Other functionalities of a UE configured to operate in accordance with a standard such as LTE would be readily understood by a worker skilled in the art.

The eNB 600 comprises a transmission abort module 610, which is configured to abort transmission of the TTI bundle from the eNB to the UE when successful receipt of the acknowledgement by the eNB fails to occur within an expected time interval. The eNB 600 further comprises various other features such as a wireless communication module, comprising a RF transmitter 680 and RF receiver 685, the wireless communication module configured to facilitate communication with the UE via an appropriate protocol, such as LTE. Downlink grants and TTI bundles may be communicated from the wireless communication module, and Downlink grant acknowledgements may be communicated to the wireless communication module, for example. The eNB further comprises a scheduling module 690 which is configured to perform resource assignment scheduling and re-scheduling, as would be readily understood by a worker skilled in the art. For example, the scheduling module 690 may be configured to schedule which resources are to be used in transmission of a TTI bundle, and to initiate configuration and transmission of scheduling support messages such as DL Grant messages. Other functionalities of an eNB configured to operate in accordance with a standard such as LTE would be readily understood by a worker skilled in the art.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

What is claimed is:

1. A method for facilitating communication between an Evolved Node B (eNB) and a user equipment (UE) in a Long Term Evolution (LTE) system, the method comprising:
   a. transmitting a downlink (DL) grant message from the eNB to the UE, the DL grant message indicative of a pending TTI bundle for transmission from the eNB to the UE;
   b. transmitting an acknowledgement message from the UE to the eNB when the DL grant message is successfully received and decoded by the UE, wherein the acknowledgement message indicates that the DL grant message has been successfully received and decoded by the UE; and
   c. aborting transmission of the TTI bundle from the eNB to the UE when successful receipt by the eNB of the acknowledgement message fails to occur within an expected time interval.

2. The method of claim 1, wherein the DL grant message comprises a request for the UE to transmit the acknowledgement message.

3. The method of claim 1, further comprising commencing transmission of the TTI bundle prior to an ending of the expected time interval, wherein aborting transmission of the TTI bundle comprises interrupting transmission of the TTI bundle.

4. The method of claim 1, further comprising commencing transmission of the TTI bundle after an ending of the expected time interval, wherein aborting transmission of the TTI bundle comprises refraining from commencing transmission of the TTI bundle.

5. The method of claim 4, wherein the DL grant message is indicative of a time at which transmission of the TTI bundle is scheduled to commence.

6. The method of claim 1, further comprising, following aborting transmission of the TTI bundle, reallocating resources which had been allocated for use in transmitting the TTI bundle.

7. The method of claim 1, further comprising rescheduling transmission of the TTI bundle following aborting transmission of the TTI bundle.

8. The method of claim 1, wherein the expected time interval corresponds to a time interval during which the acknowledgement message would have likely been received by the eNB were it transmitted from the UE.

9. The method of claim 1, further comprising refraining from transmitting the acknowledgement message from the UE to the eNB when the DL grant message fails to be successfully received and decoded by the UE.

10. The method of claim 1, further comprising refraining from aborting transmission of the TTI bundle from the eNB to the UE when successful receipt by the eNB of the acknowledgement message occurs within the expected time interval.

11. The method of claim 1, wherein the DL grant message is indicative of a time at which transmission of the TTI bundle is scheduled to commence, and wherein the TTI bundle is transmitted in full, beginning at said time, unless said aborting transmission of the TTI bundle occurs.

12. A system for use in a Long Term Evolution (LTE) system, the system comprising:
   a. a User Equipment (UE) including a downlink (DL) grant acknowledgement module, the DL grant acknowledgement module configured to transmit an acknowledgement message from the UE to an Evolved Node B (eNB) in response to a downlink (DL) grant message being successfully received and decoded, the DL grant message transmitted from the eNB to the UE and indicative of a pending TTI bundle for transmission from the eNB to the UE, wherein the acknowledgement message indicates that the DL grant message has been successfully received and decoded by the UE; and
   b. the eNB including a transmission abort module, the transmission abort module configured to abort transmission of the TTI bundle from the eNB to the UE when successful receipt by the eNB of the acknowledgement message fails to occur within an expected time interval.

13. The system of claim 12, wherein the DL grant message comprises a request for the UE to transmit the acknowledgement message.

14. The system of claim 12, wherein the eNB is configured to commence transmission of the TTI bundle prior to an ending of the expected time interval, and wherein the transmission abort module is configured to abort transmission of the TTI bundle by interrupting transmission of the TTI bundle.

15. The system of claim 12, wherein the eNB is configured to commence transmission of the TTI bundle after an ending of the expected time interval, and wherein the transmission abort module is configured to abort transmission of the TTI bundle by causing the eNB to refrain from commencing transmission of the TTI bundle.

16. The system of claim 15, wherein the DL grant message is indicative of a time at which transmission of the TTI bundle is scheduled to commence.

17. The system of claim 12, wherein the eNB is further configured, following aborting transmission of the TTI bundle, to reallocate resources which had been allocated for use in transmitting the TTI bundle.

18. The system of claim 12 wherein the eNB is further configured to reschedule transmission of the TTI bundle following aborting transmission of the TTI bundle.

19. The system of claim 12, wherein the expected time interval corresponds to a time interval during which the acknowledgement message would have likely been received by the eNB were it transmitted from the UE.

20. The system of claim 12, wherein the DL grant acknowledgement module is further configured to refrain from transmitting the acknowledgement message from the UE to the eNB when the DL grant message fails to be successfully received and decoded by the UE.

21. The system of claim 12, wherein the transmission abort module is further configured to refrain from aborting transmission of the TTI bundle from the eNB to the UE when successful receipt by the eNB of the acknowledgement message occurs within the expected time interval.

22. The system of claim 12, wherein the DL grant message is indicative of a time at which transmission of the TTI bundle is scheduled to commence, and wherein the TTI bundle is transmitted in full, beginning at said time, unless said aborting transmission of the TTI bundle occurs.

23. A computer program product comprising a non-transitory computer readable medium storing computer executable statements and instructions thereon that, when executed by a computer, perform operations for facilitating communication between an Evolved Node B (eNB) and a user equipment (UE) in a Long Term Evolution (LTE) system, the operations comprising:
   a. transmitting a downlink (DL) grant message from the eNB to the UE, the DL grant message indicative of a pending TTI bundle for transmission from the eNB to the UE;

b. transmitting an acknowledgement message from the UE to the eNB when the DL grant message is successfully received and decoded by the UE, wherein the acknowledgement message indicates that the DL grant message has been successfully received and decoded by the UE;

c. aborting transmission of the TTI bundle from the eNB to the UE when successful receipt by the eNB of the acknowledgement message fails to occur within an expected time interval.

24. The computer program product of claim 23, wherein the DL grant message is indicative of a time at which transmission of the TTI bundle is scheduled to commence, and wherein the TTI bundle is transmitted in full, beginning at said time, unless said aborting transmission of the TTI bundle occurs.

* * * * *